(12) United States Patent
Hull et al.

(10) Patent No.: US 8,991,546 B2
(45) Date of Patent: Mar. 31, 2015

(54) WORK VEHICLE WITH FLUID ATTENTUATOR

(71) Applicant: Deere & Company, Moline, IL (US)

(72) Inventors: Mark E. Hull, Peosta, IA (US);
Zachary T. Flatley, Cuba City, WI (US);
Richard J. Ginsterblum, Dubuque, IA (US)

(73) Assignee: Deere & Company, Moline, IL (US)

( * ) Notice: Subject to any disclaimer, the term of this patent is extended or adjusted under 35 U.S.C. 154(b) by 22 days.

(21) Appl. No.: 13/848,492

(22) Filed: Mar. 21, 2013

(65) Prior Publication Data

US 2014/0284131 A1   Sep. 25, 2014

(51) Int. Cl.
F04C 29/00 (2006.01)
E02F 9/08 (2006.01)
F04B 53/00 (2006.01)
F15D 1/02 (2006.01)
F04B 11/00 (2006.01)

(52) U.S. Cl.
CPC ............ *E02F 9/0866* (2013.01); *F04C 2270/14* (2013.01); *F04C 2270/12* (2013.01); *F04B 53/001* (2013.01); *F15D 1/02* (2013.01); *F04B 11/00* (2013.01); *F04C 29/0035* (2013.01); *F04C 2270/13* (2013.01)
USPC ........... 180/291; 180/311; 180/312; 417/540; 138/26; 60/469

(58) Field of Classification Search
CPC .. F04B 11/00; F04B 11/0008; F04B 11/0091; F04B 53/001; F04C 29/0035; F04C 2270/12; F04C 2270/125; F04C 2270/13; F04C 2270/135; F04C 2270/14; F04C 2270/145; B60R 11/00; F16L 55/04; F16L 55/033; F16L 55/02; F15D 1/02; F15D 1/025
USPC ................... 180/291, 311, 312; 417/312, 540; 138/26; 123/195 R, 195 A, 198 R, 198 C, 123/198 E
See application file for complete search history.

(56) References Cited

U.S. PATENT DOCUMENTS

| | | | | |
|---|---|---|---|---|
| 2,747,564 A | * | 5/1956 | Wehling | ........................ 123/196 S |
| 2,943,641 A | | 7/1960 | Arnold et al. | |
| 3,323,305 A | | 6/1967 | Klees et al. | |
| 3,412,279 A | | 11/1968 | Allen et al. | |
| 3,708,977 A | * | 1/1973 | Raymond | ........................ 60/453 |
| 3,894,603 A | * | 7/1975 | Winzeler | ........................ 180/53.1 |
| 4,021,341 A | | 5/1977 | Cosentino et al. | |
| 4,081,050 A | * | 3/1978 | Hennessey et al. | ........... 180/233 |
| 4,473,043 A | * | 9/1984 | Furukawa et al. | ...... 123/196 AB |
| 4,507,063 A | * | 3/1985 | Kemmner et al. | ............ 417/540 |
| 4,642,035 A | | 2/1987 | Nyquist | |
| 4,888,962 A | * | 12/1989 | Harper et al. | .................... 62/503 |

(Continued)

OTHER PUBLICATIONS

Background Information (1 page)(admitted as prior art before Mar. 21, 2013).

*Primary Examiner* — J. Allen Shriver, II
*Assistant Examiner* — Steve Clemmons

(57) ABSTRACT

A work vehicle comprises a chassis, a compartment, a vibratory power unit positioned in the compartment and mounted to the chassis to move in vibration relative to the chassis, a pump, a fluid attenuator, and a rigid tube. The pump and the fluid attenuator are mounted to the vibratory power unit to move in vibration relative to the chassis. The rigid tube interconnects the pump and the fluid attenuator for fluid communication therebetween.

14 Claims, 9 Drawing Sheets

(56) References Cited

U.S. PATENT DOCUMENTS

| | | | |
|---|---|---|---|
| 5,312,174 A | 5/1994 | Beilfuss et al. | |
| 5,353,840 A * | 10/1994 | Paley et al. | 138/31 |
| 5,791,141 A * | 8/1998 | Phillips | 60/327 |
| 6,004,119 A * | 12/1999 | Hamasaki et al. | 418/181 |
| 6,041,618 A * | 3/2000 | Patel et al. | 62/503 |
| 6,309,187 B1 * | 10/2001 | Robertson et al. | 417/312 |
| 6,419,537 B1 | 7/2002 | House et al. | |
| 6,854,269 B2 * | 2/2005 | Hale | 60/417 |
| 6,866,066 B2 * | 3/2005 | Weber | 138/31 |
| 7,506,619 B1 * | 3/2009 | Lak et al. | 123/41.49 |
| 7,836,967 B2 * | 11/2010 | Daniel et al. | 172/781 |
| 2003/0042391 A1 * | 3/2003 | Hotta et al. | 248/544 |
| 2003/0159876 A1 | 8/2003 | Drouet | |
| 2008/0134675 A1 * | 6/2008 | Epshteyn | 60/489 |
| 2010/0018199 A1 * | 1/2010 | Boock | 60/469 |
| 2012/0061552 A1 * | 3/2012 | Haehn et al. | 248/636 |
| 2013/0251557 A1 * | 9/2013 | Ota et al. | 417/410.1 |

\* cited by examiner

WORK VEHICLE WITH FLUID ATTENTUATOR

FIELD OF THE DISCLOSURE

The present disclosure relates to a work vehicle with a fluid attentuator.

BACKGROUND OF THE DISCLOSURE

A work vehicle with a hydraulic system is known to have a hydraulic pump and a hydraulic attenuator coupled fluidly to the pump. The hydraulic attenuator slows the velocity of the hydraulic fluid and attenuates pressure pulsations in the hydraulic fluid from the pump so as to dampen sound that otherwise may be generated. The engine of the work vehicle is mounted to the chassis of the work vehicle to move in vibration relative to the chassis. Vibration of the engine is dampened between the engine and the chassis so as to minimize transfer of vibration from the vibratory power unit to the chassis. The engine is thus "isolated" from the chassis. The hydraulic attenuator is mounted to the vehicle chassis. The pump is mounted to the engine, and can therefore vibrate relative to the chassis. Thus the pump can move in vibration relative to the attenuator. Stated otherwise, the pump is isolated from the attenuator. To account for such relative movement, a flexible hose is connected between the pump outlet and the attenuator inlet.

SUMMARY OF THE DISCLOSURE

With the implementation of increasingly stringent emissions regulations (e.g., what is commonly referred to as Final Tier 4 Emissions Regulations or "FT4" in the United States), packaging in the engine compartment has become increasingly difficult due to inclusion of additional emissions abatement equipment in the engine compartment. The additional emissions abatement equipment may include, for example, a selective catalytic reduction catalyst (SCR catalyst) downstream of both a diesel particulate filter (DPF) and a diesel oxidation catalyst (DOC) (the DPF and DOC also positioned in the engine compartment) and an ammonia oxidation catalyst (AOC) downstream of the SCR catalyst. A diesel exhaust fluid tank (DEF tank) coupled fluidly to the exhaust line between the DPF and the SCR catalyst.

To compensate for this addition of FT4 emissions abatement equipment, the engine compartment may be increased in size. However, increasing the size of the engine compartment may sacrifice operator visibility, and ultimately productivity. The present disclosure considers an alternative arrangement avoiding an increase in the size of the engine compartment or otherwise promoting minimization of such an increase.

In some work vehicle hydraulic applications with the hydraulic pump mounted to the engine and the hydraulic attenuator mounted to the chassis, the flexible hose fluidly coupling the pump and the attenuator is relatively large in diameter with a relatively large bend radius. This causes the hose to take up a substantial amount of physical space.

In order to reduce the amount of physical space occupied by the flexible hose, the attenuator can be "hard mounted" to the same vibratory power unit as the pump. This eliminates the need for a large diameter and large bend radius hydraulic hose, because isolation between the two components is no longer necessary. Since the requirement for isolation no longer exists, a rigid tube, made, for example, of steel, can be used to make the connection between the pump and attenuator. The rigid tube has a fixed shape along its length and in cross section transverse to its length.

A rigid tube has a distinct packaging and durability advantage over a hydraulic hose. A rigid tube can have a substantially smaller bend radius and a smaller outside diameter, and is less susceptible to pin-hole leaks along its length. The use of a rigid tube in the connection between the pump and the attenuator may be made possible by mounting the attenuator to the same vibratory power unit as the pump.

According to an aspect of the present disclosure, a work vehicle comprises a chassis, traction elements supporting the chassis, a compartment, a vibratory power unit positioned in the compartment and mounted in isolation to the chassis to move in vibration relative to the chassis, a pump, a hydraulic attenuator, and a rigid tube. The pump and the fluid attenuator are mounted to the vibratory power unit to move in vibration relative to the chassis. The rigid tube interconnects the pump and the fluid attenuator for fluid communication therebetween. Such an arrangement promotes compact packaging in the compartment, which may be particularly useful for accommodating the addition of emissions abatement equipment in the compartment.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
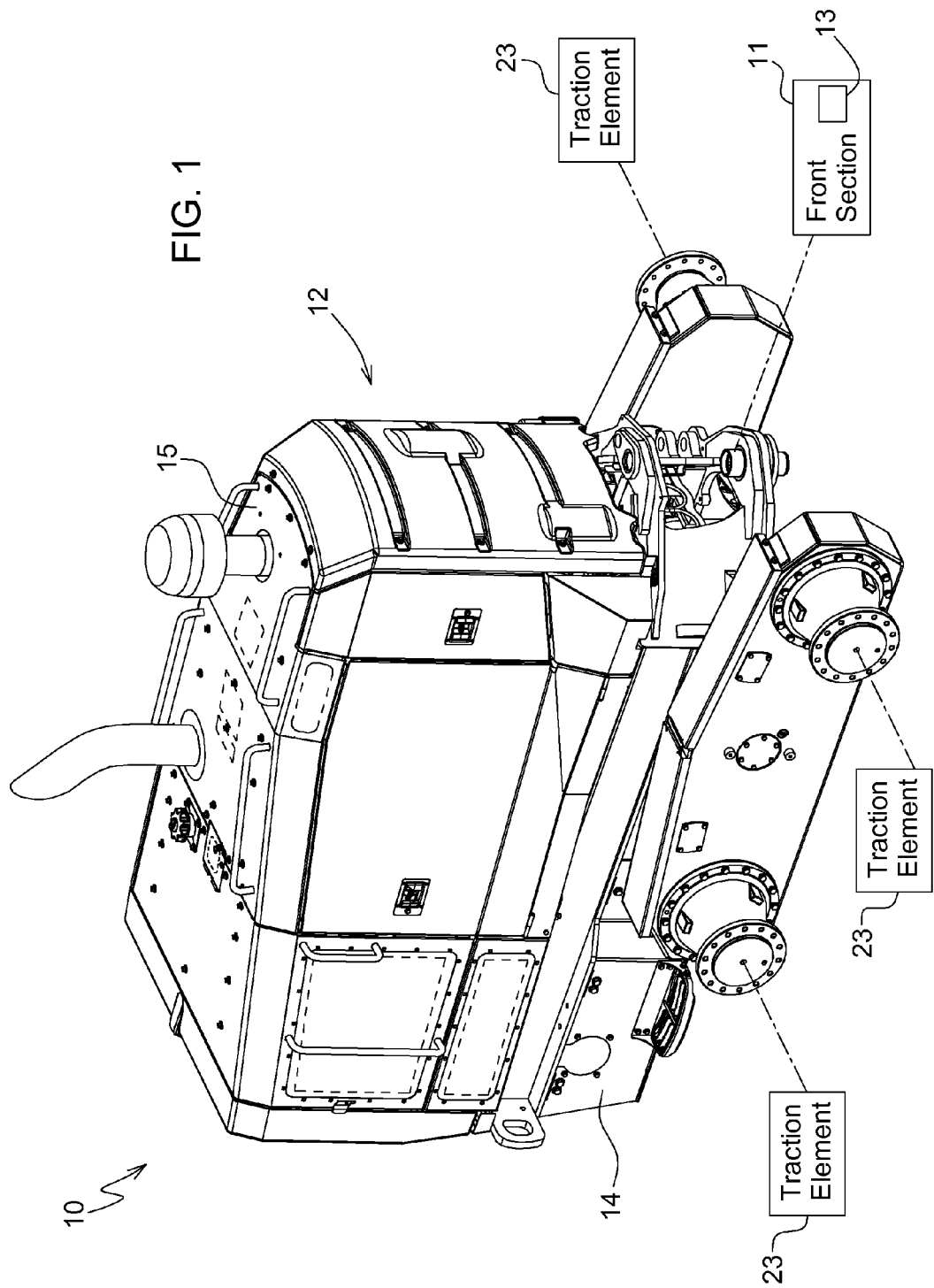
FIG. 1 is a perspective view showing a rear section of a work vehicle such as, for example, a motor grader.

Referring to FIG. 1, in an example, a self-propelled work vehicle 10 is configured as a motor grader comprising a front section 11 and a rear section 12, the front and rear sections 11, 12 articulated to one another. The front section 11 comprises an operator's station 13 (e.g., cab) from which a human operator can operate the vehicle 10.

Figure 2:
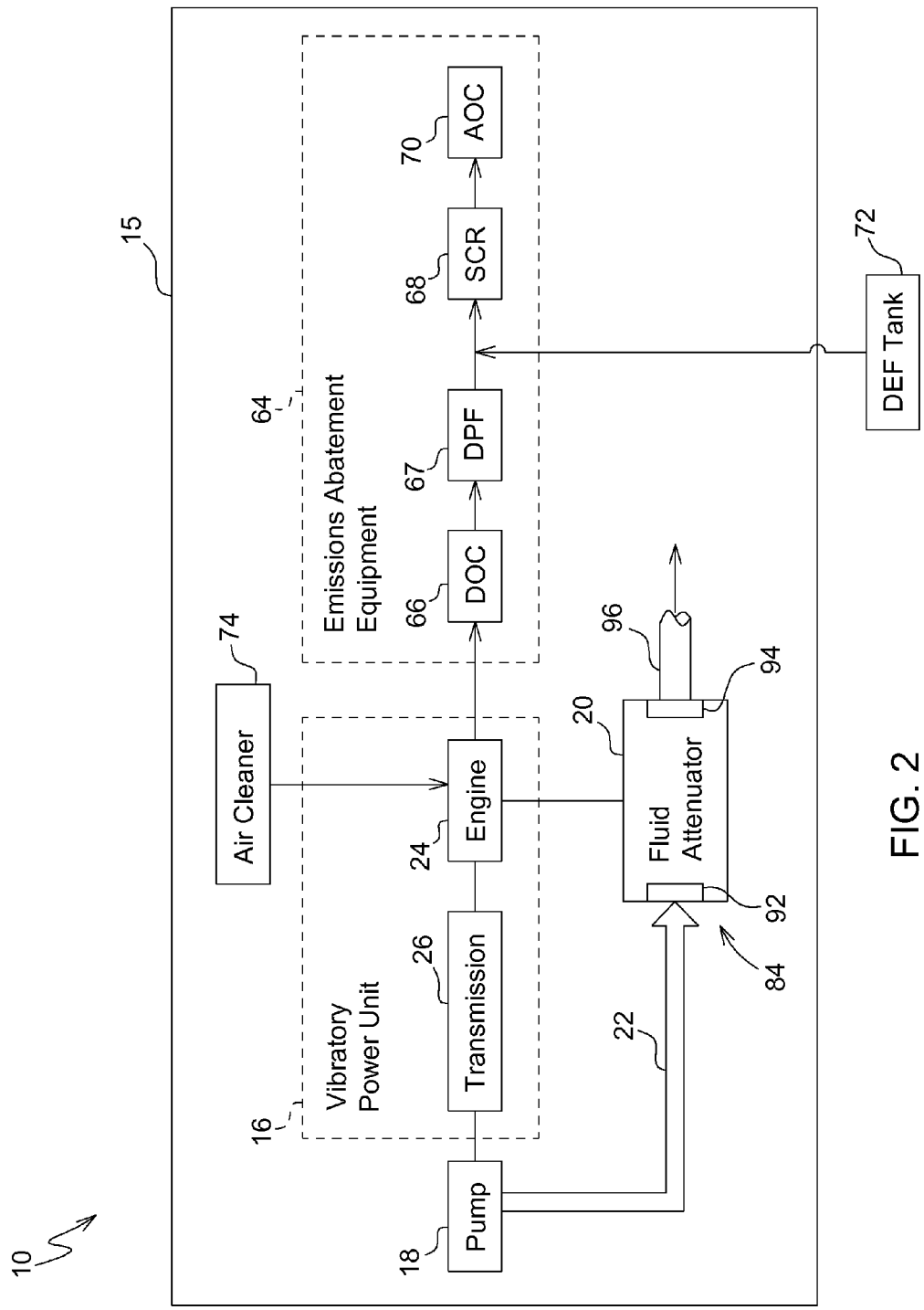
FIG. 2 is a diagrammatic view showing components positioned in a compartment of the work vehicle.
Figure 3:
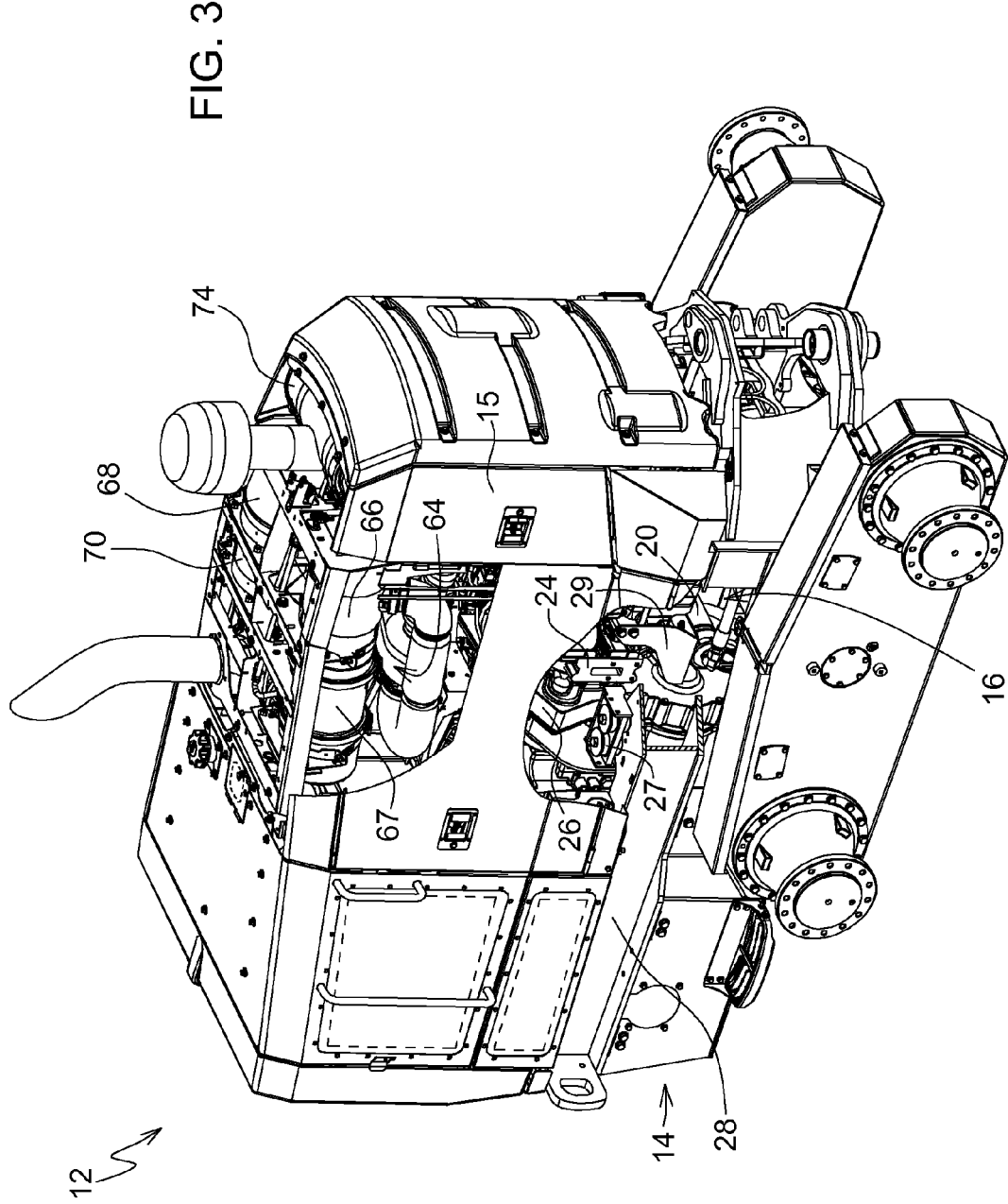
FIG. 3 is a perspective view showing the rear section with portions broken away.

Referring to FIGS. 2 and 3, the rear section 12 comprises a chassis 14, a compartment 15, a vibratory power unit 16, a fluid pump 18, a fluid attenuator 20, and a rigid tube 22. The vibratory power unit 16 is positioned in the compartment 15 and is mounted in isolation to the chassis 14 to move in vibration relative to the chassis 14. The pump 18 and the attenuator 20 are mounted to the vibratory power unit 16 also to move in vibration relative to the chassis 14. The rigid tube 22 interconnects the pump 18 and the attenuator 20 for fluid communication therebetween. Such an arrangement promotes compact packaging in the compartment 15, which may be particularly useful for accommodating the addition of emissions abatement equipment 64 in the compartment 15.

The rear section 12 comprises ground-engaging traction elements 23 supporting the chassis 14 for propulsion of the vehicle 10 along the ground, as shown diagrammatically, for example, in FIG. 1. In the case of a motor grader, the traction elements 23 are wheels (e.g., four wheels), and the front section 11 also comprises wheels (e.g., two). In other work vehicle examples, the traction elements may include tracks as in a track-type vehicle.

Figure 4:
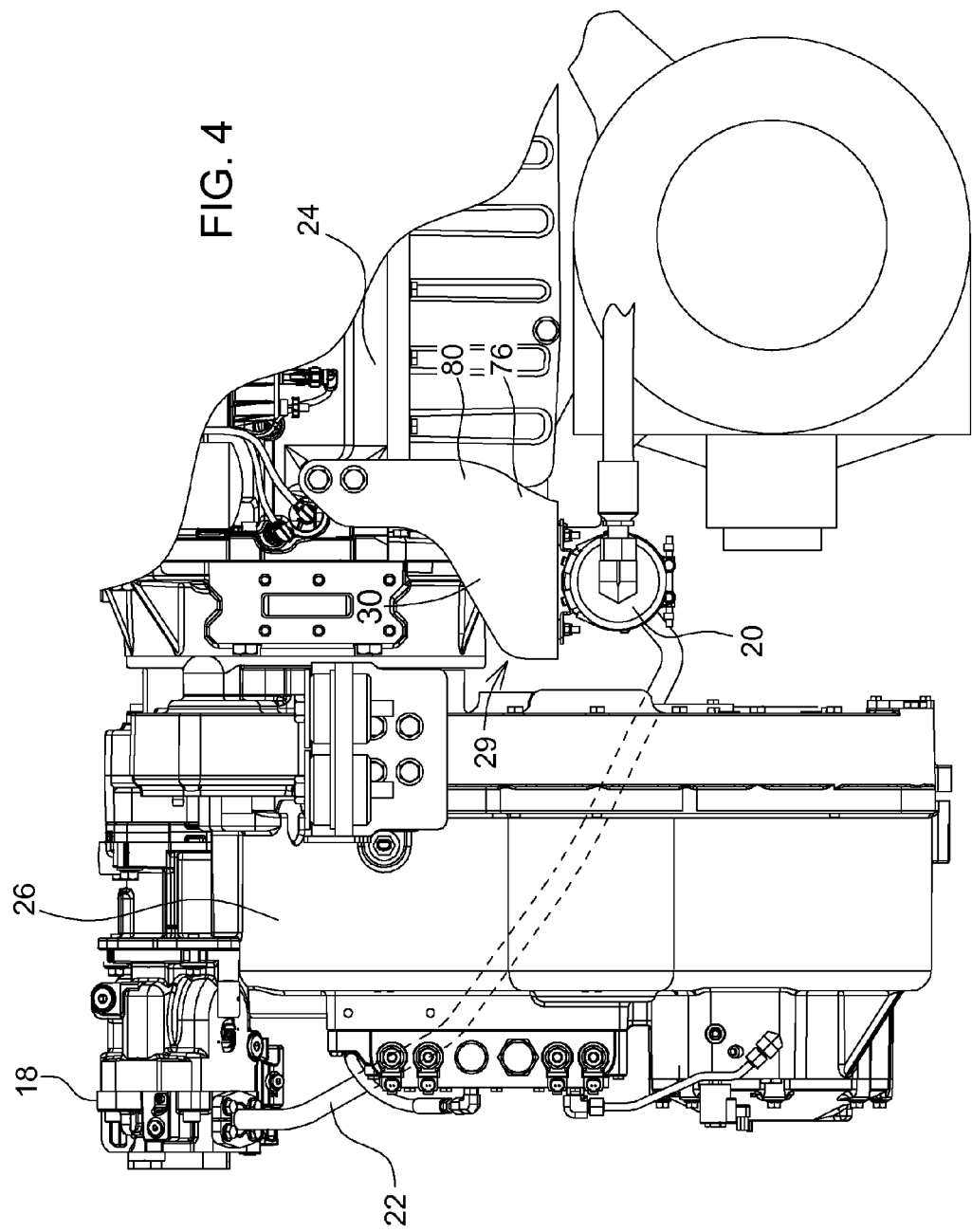
FIG. 4 is a right-hand side elevation view showing a pump mounted to a transmission, a fluid attenuator mounted to an engine, and a rigid tube interconnecting the pump and the attenuator for fluid communication therebetween.

Referring to FIG. 4, the machine 10 may comprise a hydraulic system comprising the pump 18 and the attenuator 20. In such a case, the pump 18 may be a hydraulic pump, and the attenuator 20 may be a hydraulic attenuator. The rigid tube 22 is made of a rigid material, such as, for example, steel, promoting its reliability. The rigid tube 22 and the attenuator 20 are included in a fluid line 84 leading downstream from the pump 18, the fluid line 84 being a hydraulic line when it is included in the hydraulic system.

Figure 5:
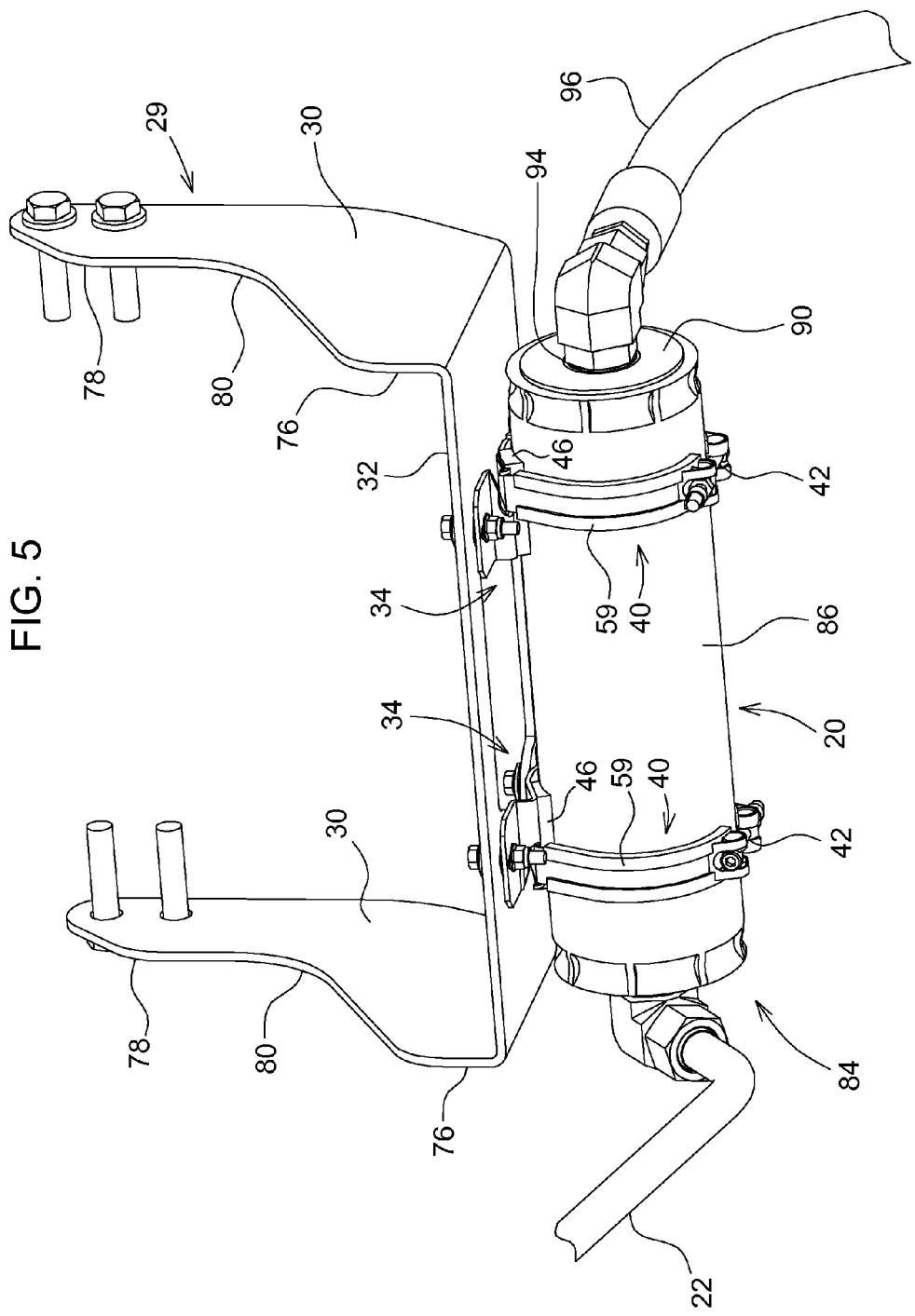
FIG. 5 is a perspective view showing the attenuator mounted to a mounting bracket for mounting the attenuator to the engine.
Figure 6:
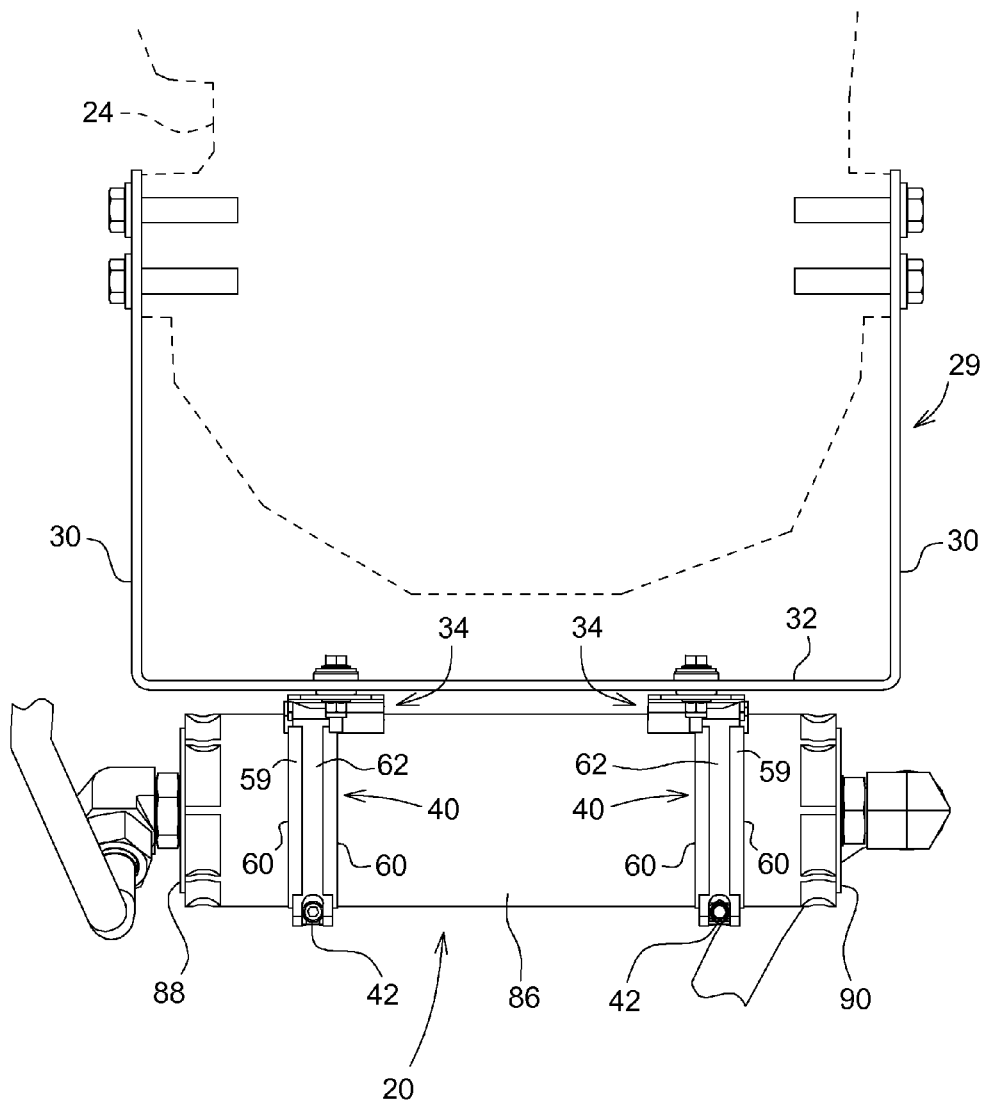
FIG. 6 is a rear elevation view showing the attenuator mounted to the mounting bracket.
Figure 7:
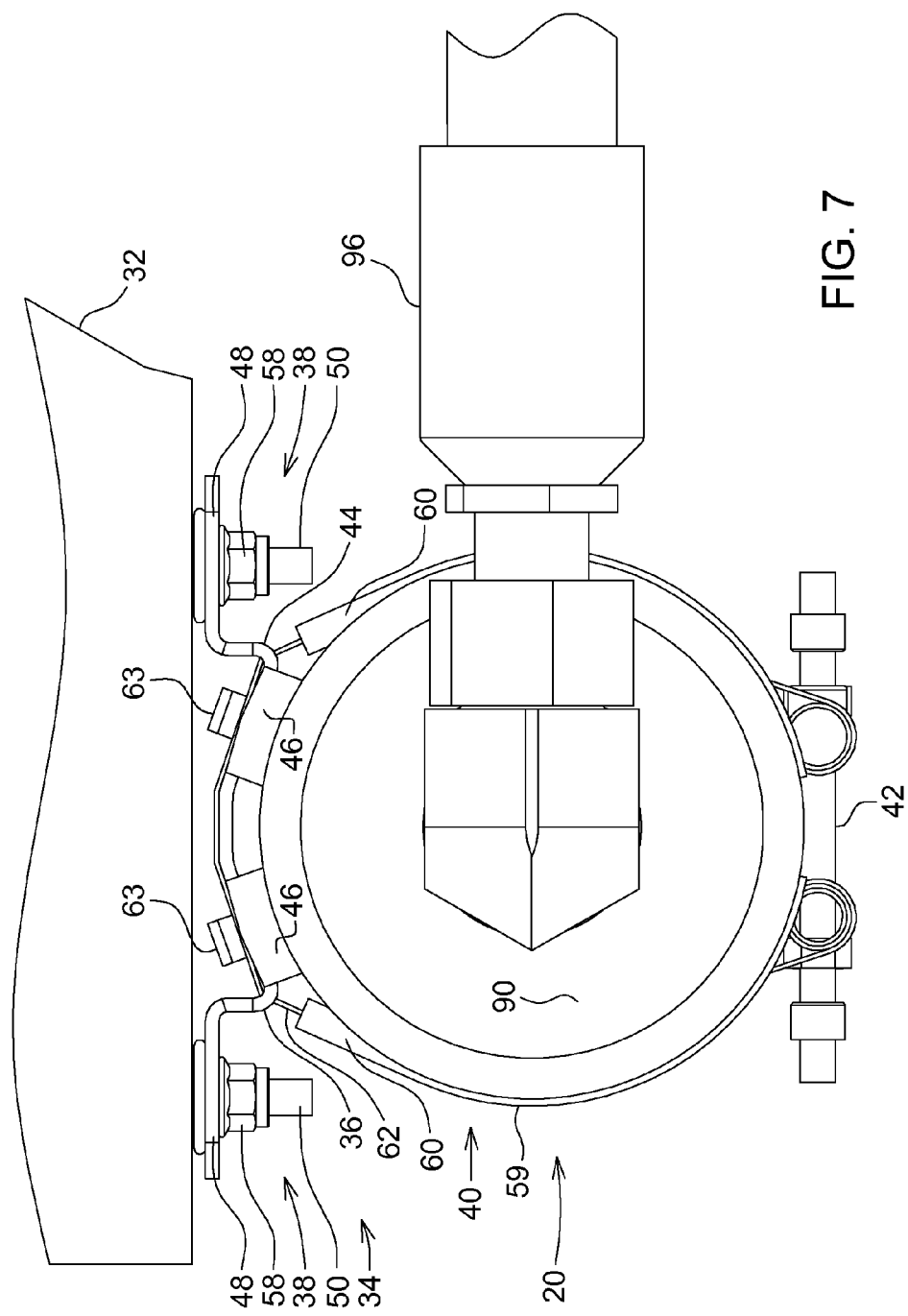
FIG. 7 is a right-hand side elevation view showing the attenuator mounted to the mounting bracket.
Figure 8:
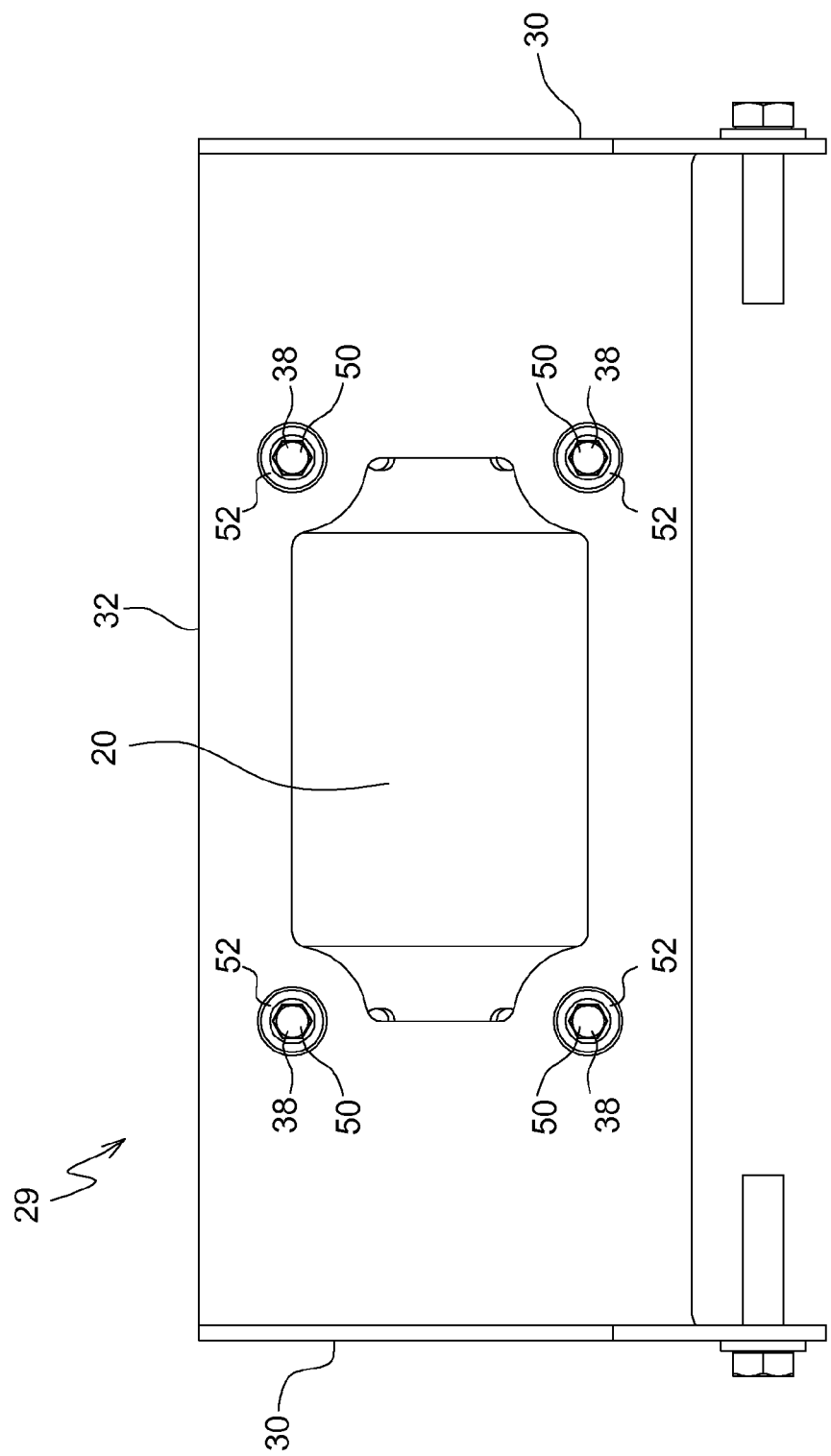
FIG. 8 is a top view showing the mounting bracket and the attenuator mounted thereto.
Figure 9:
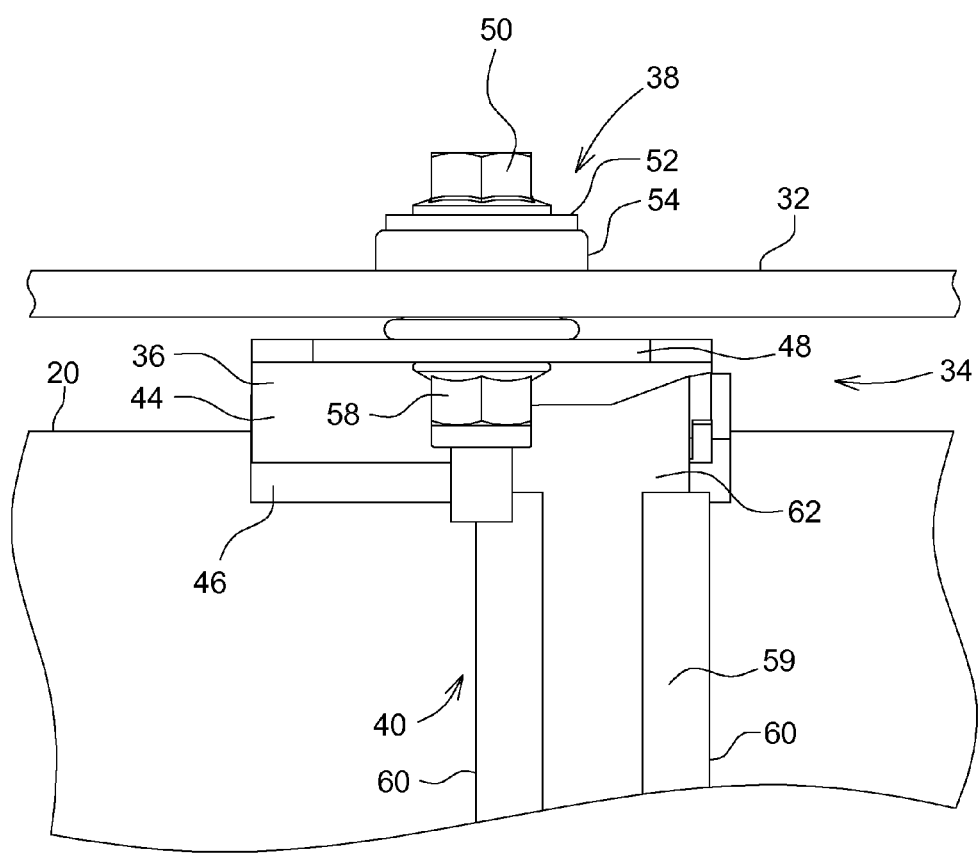
FIG. 9 is a rear elevation view showing a coupler for mounting the attenuator to the mounting bracket.

Referring to FIGS. 5 and 6, the attenuator 20 comprises a hollow tubular main attenuating body 86, a first end face 88, and a second end face 90. The first and second end faces 88, 90 are attached to opposite ends of the main attenuating body 86.

Referring to FIGS. 2 and 5, the attenuator 20 comprises an inlet 92 in the first end face 88 and an outlet 94 in the second end face 90. The inlet 88 is coupled fluidly to the rigid tube 22. The outlet 92 is coupled fluidly to a hose 96 included in the line 84 so as to conduct fluid away from the attenuator 20. The main attenuating body 86 has a larger inner diameter than the rigid tube 22 and the hose 96; stated otherwise, the main attenuating body 86 has a larger internal cross-sectional area than the internal cross-sectional area of each of the rigid tube 22 and the hose 96 leading to lower fluid velocities. The attenuator 20 is thus capable of attenuating pressure pulsations in the fluid from the pump 18 as the fluid flows in the line 84 from the rigid tube 22 to the hose 96.

Referring to FIGS. 2-4, the vibratory power unit 16 may comprise an engine 24 and a transmission 26. The housing of the engine 24 and the housing of the transmission 26 are fixed to one another against movement relative to one another. The engine 24 and the transmission 26 are positioned in the compartment 15. The compartment 15 may thus be the engine compartment of the machine 10. The attenuator 20 is mounted with the engine 24 and the transmission 26 to move in vibration relative to the chassis 14. The engine 24 may be an internal combustion engine (e.g., compression ignition such as diesel; spark ignition).

The vibratory power unit 16 is mounted to the chassis 14 to move in vibration relative to the chassis 14. Vibration of the vibratory power unit 16 is dampened between the vibratory power unit 16 and the chassis 14 so as to minimize any transfer of vibration from the vibratory power unit 16 to the chassis 14. The vibratory power unit 16 is thus isolation-mounted to the chassis 14 so as to be isolated from the chassis 14.

In the illustrated embodiment, the transmission 26 is mounted in isolation to the chassis 14 with two isolation units 27 positioned respectively on laterally opposite sides of the transmission 26, one of which is shown, for example, in FIG. 3. Each isolation unit comprises an inverted L-shaped bracket that "floats" on the chassis 14 and to which the transmission 26 is fastened (e.g., bolted with four bolts and a respective washer for each bolt). The L-shaped bracket has a first leg extending over a box beam 28 of the chassis 14 and a second leg depending from the first leg laterally inboard of that beam 28. Each isolation unit further comprises two compressible units.

Each compressible unit comprises an upper compressible ring, a lower compressible ring, a bolt, and a washer. Each compressible ring is made of compressible material such as, for example, rubber. The upper and lower compressible rings are positioned respectively above and below the first leg of the L-shaped bracket. The bolt extends downwardly in sequence from its head through the washer, the upper compressible ring, the first leg of the L-shaped bracket, the second compressible ring, and into a lug of the chasses 12 and an angle gusset.

The lug of the chassis 14 comprises a lug portion of a top plate of the box beam 28 and a lug plate welded onto the top of the top plate lug portion. The angle gusset extends between and is welded onto the underside of the top plate and a laterally inboard vertical plate of the box beam 28. The bolt is threaded to any one or more of the lug plate, the top plate lug portion, and the angle gusset (e.g., all three).

In other embodiments, the engine 24, rather than the transmission 26, may be isolation-mounted to the chassis 14.

Referring to FIG. 4, the pump 18 is mounted to the transmission 26. The housing of the pump 18 is fixed to the housing of the transmission 26 against movement relative thereto.

The attenuator 20 is mounted to the engine 24. The vibratory power unit 16 comprises a mounting bracket 29. The attenuator 20 is mounted to the mounting bracket 29, and the mounting bracket 29 is mounted to the engine 24.

Referring to FIGS. 4 and 5, the mounting bracket 29 comprises, for example, a first arm 30, a second arm 30, and a platform 32. The first and second arms 30 are mounted to and depend from the engine 24. The first and second arms 30 are fastened or otherwise secured to the engine housing. Each arm 30 is fastened to the engine housing. The platform 32 interconnects the first and second arms 30. The mounting bracket 29 is, for example, U-shaped and configured as a one-piece metal structure.

Each arm 30 is angled to accommodate packaging constraints. The arm 30 comprises a proximal portion 76 extending from the platform 32, a distal portion 78 distal from the platform 32, and an elbow 80 positioned between the proximal portion 76 and the distal portion 78. The distal portion 80 is fastened to the engine housing with, for example, two bolts and respective washers (one for each bolt), and is generally vertical. The arm 30 makes a turn at the elbow 80 such that the proximal portion 76 angles rearwardly and downwardly from the elbow 80 to the platform 32. As such, the platform 32 is clear of an axle 82 in the driveline of the work vehicle 10.

Referring to FIGS. 6-9, the attenuator 20 is mounted to the platform 32 by use of, for example, two couplers 34 of the work vehicle 10. Each coupler 34 comprises a support bracket 36, two fastener units 38 fastening the support bracket 36 to the platform 32, and a strap unit 40 positioned around the attenuator 20 and threadedly tightened with a tightening device 42 of the strap unit 40.

The support bracket 36 comprises a generally W-shaped deck 44, two feet 46 attached to and underlying the bottom of the deck 44 and positioned on the attenuator 20, and two flanges 48 extending outwardly from respectively opposite side legs of the deck 44 (e.g., the deck 44 and flanges 48 are part of the same formed plate). Each foot 46 is made, for example, of a compressible material (e.g., rubber).

Each fastener unit 38 fastens a respective flange 48 to the platform 32. The fastener unit 38 comprises a threaded bolt 50, a washer 52, a grommet 54 (made, for example, of a compressible material such as rubber), and a nut 58. The grommet 54 is positioned in a hole of the platform 32 and a hole in the flange 48 and comprises an annular portion extending between the platform 32 and the flange 48 so as to be compressed therebetween. The bolt 50 extends through the washer 52 and the grommet 54, and thus through the holes in the platform and the flange 48. The washer 52 is positioned between the head of the bolt 50 and the grommet 54. The nut 58 is threaded onto the bolt 50 against the flange 48.

The strap unit 40 straps a respective end portion of the attenuator 20 to the support bracket 36. The strap unit 40 comprises a strap 50 and the tightening device 42. The strap 59 comprises a central band 62 and two side strips 60. The two side strips 60 are attached respectively to opposite side edges of the central band 62. Each side strip 60 is made, for example, of a compressible material (e.g., rubber) and is generally U-shaped so as to fit over a respective side edge of the band 62 and contact an outer surface of the attenuator 20. The central band 62 extends over the deck 44 thereon. The tightening device 42 tightens the straps strap 59 onto the respective end portion of the attenuator 20 so as to secure the attenuator 20 to the support bracket 36. Each foot 46 comprises a finger 63 that extends upwardly through a respective hole in the deck 44 and over the central band 62 to facilitate positioning of the band 62 on the deck 44.

The platform 32 comprises a hole 63, reducing the weight of the mounting bracket 29. The fastener units 38 are positioned about the hole 63. The hole 63 is generally octagonal, and the fastener units 38 are positioned symmetrically about the hole 63 at respective sides of the octagon.

In other embodiments, the attenuator 20 may be mounted to the transmission 26 or other components of the vibratory power unit 16.

Referring to FIGS. 2 and 3, the work vehicle 10 may comprise emissions abatement equipment 64 positioned in the compartment 15. That emissions abatement equipment 64 may comprise, for example, a DOC 66, a DPF 67 downstream of the DOC 66, an SCR catalyst 68 downstream of the DPF 67, and an AOC 70 downstream of the SCR catalyst 68. A DEF tank 72 of the work vehicle 10 is coupled fluidly to the exhaust line between the DPF 67 and the SCR catalyst 68.

The work vehicle 10 may comprise an air cleaner 74 positioned in the compartment 15. The air cleaner 70 is positioned upstream of the engine 24 to remove contaminants from air before ingestion of the air by the engine 24.

The work vehicle 10 may take the form of any work vehicle or work machine.

Welds and threads have not been shown in the drawings for simplification of illustration, it being understood that it would be well within the skill of one of ordinary skill in the art to provide those features without undue experimentation. Dashed enclosures in FIGS. 1 and 3 represent perforation fields (e.g., screens), which may take on a wide variety of shapes and sizes. The rear section 12 may include other perforation fields.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A work vehicle, comprising
   a chassis,
   traction elements supporting the chassis,
   a compartment,
   a vibratory power unit positioned in the compartment and mounted in isolation to the chassis to move in vibration relative to the chassis,
   a fluid pump,
   a fluid attenuator, the pump and the fluid attenuator mounted to the vibratory power unit to move in vibration relative to the chassis, and
   a rigid tube interconnecting the pump and the fluid attenuator for fluid communication therebetween.

2. The work vehicle of claim 1, wherein the vibratory power unit comprises an engine positioned in the compartment, and the pump and the fluid attenuator are mounted to the engine.

3. The work vehicle of claim 2, wherein the vibratory power unit comprises a mounting bracket mounted to the engine, and the fluid attenuator is mounted to the mounting bracket.

4. The work vehicle of claim 3, wherein the mounting bracket comprises a first arm, a second arm, and a platform, the first and second arms depend from the engine, the platform interconnects the first and second arms, and the fluid attenuator is mounted to the platform.

5. The work vehicle of claim 2, wherein the vibratory power unit comprises a transmission, and the pump and the fluid attenuator are mounted with the transmission to move in vibration relative to the chassis.

6. The work vehicle of claim 1, wherein the vibratory power unit comprises a transmission, and the pump and the fluid attenuator are mounted with the transmission to move in vibration relative to the chassis.

7. The work vehicle of claim 1, comprising emission abatement equipment positioned in the compartment.

8. The work vehicle of claim 1, wherein the pump is a hydraulic pump, and the fluid attenuator is a hydraulic attenuator.

9. The work vehicle of claim 8, wherein the fluid attenuator comprises a hollow tubular body and a cross-sectional area of the hollow tubular body is greater than a cross-sectional area of the rigid tube.

10. The work vehicle of claim 9, wherein the cross-sectional area of the hollow tubular body is at least five times the cross-sectional area of the rigid tube.

11. The work vehicle of claim 10, wherein a length of the hollow tubular body in the direction of hydraulic flow is at least ten times an inner diameter of the rigid tube.

12. The work vehicle of claim 11, further comprising a mounting bracket, wherein:
    the mounting bracket comprises a first arm mounted to the vibratory power unit, a second arm mounted to the vibratory power unit, and a platform interconnecting the first arm and the second arm; and
    the fluid attenuator is mounted to the vibratory power unit via the mounting bracket.

13. The work vehicle of claim 9, further comprising a flexible hose, wherein the fluid attenuator is fluidly connected to the rigid tube at a first end of the fluid attenuator and is fluidly connected to the flexible hose at a second end of the fluid attenuator opposite the first end.

14. The work vehicle of claim 1, wherein the fluid attenuator is fluidly connected to the fluid pump such that a majority of flow from the hydraulic pump flows through the fluid attenuator.

* * * * *